Patented Sept. 15, 1931

1,823,752

UNITED STATES PATENT OFFICE

CARL HENRIK MICHELSON, OF ABO, FINLAND

METHOD OF REFINING THE SOAP FLOATING ON THE WASTE-LIQUORS OBTAINED IN THE MANUFACTURE OF SULPHATE- OR SODIUM CELLULOSE AS WELL AS SULPHITE WASTE-LIQUOR

No Drawing. Application filed April 19, 1929, Serial No. 356,619, and in Finland May 9, 1928.

In the manufacture of sulphate- or sodium cellulose, a saponaceous product is known to be formed, the same floating on the waste-liquor and consisting substantially of alkali salts of fatty or resinous acids. Out of this "soap", as it is called, one has endeavoured to produce pure fatty and resinous acids in various ways. The product has been decomposed with acids, the fatty and resinous acids having thus been liberated, and forming a so-called floating rosin. This floating rosin has then been subjected to further purifying processes. The product has been distilled, and so forth, without it being possible, however, entirely to remove therefrom evil smelling and other contaminations.

According to the present invention, pure fatty and resinous acids are obtained from the "soap", and at the same time sulphite waste-liquor is refined. The method consists in that the "soap", whether in the crude state or purified in some way or other, is thoroughly stirred with sulphite waste-liquor at room temperature or while being subjected to heating. The sulphite waste-liquor is used either as it is obtained in the manufacture of sulphite cellulose or in a more or less concentrated form, or, as a residue from the manufacture of sulphite yeast or sulphite alcohol. The fatty and resinous acids contained in the "soap" and also in the sulphite waste-liquor are liberated and extracted from the mixture with the aid of a suitable solvent, such as benzine or the like. The solvent is expelled and a residue obtained in the form of a pure product consisting of fatty and resinous acids which may be separated according to known methods. The extraction with the solvent may be effected at room temperature or under heating. It is also possible to proceed by leaving the mixture to stay after the "soap" has been thoroughly stirred with sulphite waste-liquor, the fatty and resinous acids then gradually forming the surface layer and permitting of being skimmed off or separated in some other manner, in order then to be further purified with a solvent or solvents, as above described. In the process, the sulphite waste-liquor is also subjected to alteration. It brightens up considerably and may be easily worked to recover valuable substances incorporated therein. It may, for instance, be readily evaporated into an absolutely dry residue.

The invention is illustrated by the following specific example, it being understood that the invention is not limited to the specific details described therein.

The sulphite waste-liquor used is withdrawn directly from a cellulose cooker and is cooled to 50° C. without addition of water. 750 to 1,000 liters of the waste-liquor are added to 100 kilograms of the so-called "soap" depending upon the degree of acidity of the waste-liquor. The "soap" and the waste liquor are mixed well for about 1½ hours in an open wooden vessel, the temperature being maintained at 50° C. during the entire time. Then the mixture is allowed to stand for about 1½ hours. At the end of this time it will be found that the mixture has separated into two layers, the upper layer consisting of resinous and fatty substance, and the lower layer consisting of the changed sulphite waste liquor. The waste-liquor is drawn off through a drain in the bottom of the vessel and is then evaporated to dryness. The resinous and fatty substance remaining behind is subjected to a further purification process depending upon the use for which it is desired. For example, it is dissolved in benzine, the solution is filtered, and the solvent is evaporated. Then, if desired, the resinous and fatty acids can be separated according to any of the methods known in the art. The fatty acid-resin acid mixture obtained in this process contains 93–95% of acids, of which 63–65% are fatty acids, and 35–37% are resin acids.

What I claim as new and desire to secure by Letters Patent of the United States of America is:—

1. In a process of recovering fatty and resinous acids from the so-called "soap" floating on the waste-liquors obtained in the manufacture of sulphate- or sodium cellulose, the step which comprises treating the said "soap" with sulphite waste-liquor.

2. In a process of recovering fatty and resinous acids from the so-called "soap" floating on the waste-liquors obtained in the manufacture of sulphate- or sodium cellulose, the step which comprises treating the said "soap" with sulphite waste-liquor at ordinary room temperature.

3. In a process of recovering fatty and resinous acids from the so-called "soap" floating on the waste-liquors obtained in the manufacture of sulphate- or sodium cellulose, the step which comprises treating the said "soap" with sulphite waste-liquor at a temperature above ordinary room temperature.

4. In a process of recovering fatty and resinous acids from the so-called "soap" floating on the waste-liquors obtained in the manufacture of sulphate- or sodium cellulose, the step which comprises treating the said "soap" with concentrated sulphite waste-liquor at ordinary room temperature.

5. In a process of recovering fatty and resinous acids from the so-called "soap" floating on the waste-liquors obtained in the manufacture of sulphate- or sodium cellulose, the step which comprises treating the said "soap" at ordinary room temperature with sulphite waste-liquor obtained in the manufacture of sulphite cellulose.

6. In a process of recovering fatty and resinous acids from the so-called "soap" floating on the waste-liquors obtained in the manufacture of sulphate- or sodium cellulose, the step which comprises treating the said "soap" at a temperature above ordinary room temperature with sulphite waste-liquor obtained in the manufacture of sulphite cellulose.

7. In a process of recovering fatty and resinous acids from the so-called "soap" floating on the waste-liquors obtained in the manufacture of sulphate- or sodium cellulose, the step which comprises treating the said "soap" with concentrated sulphite waste-liquor at a temperature above ordinary room temperature.

8. In a process of recovering fatty and resinous acids from the so-called "soap" floating on the waste-liquors obtained in the manufacture of sulphate- or sodium cellulose, the step which comprises treating the said "soap" at ordinary room temperature with sulphite waste-liquor obtained in the manufacture of sulphite yeast.

9. In a process of recovering fatty and resinous acids from the so-called "soap" floating on the waste-liquors obtained in the manufacture of sulphate- or sodium cellulose, the step which comprises treating the said "soap" at ordinary room temperature with sulphite waste-liquor obtained in the manufacture of sulphite alcohol.

10. In a process of recovering fatty and resinous acids from the so-called "soap" floating on the waste-liquors obtained in the manufacture of sulphate- or sodium cellulose, the step which comprises treating the said "soap" at a temperature above ordinary room temperature with sulphite waste-liquor obtained in the manufacture of sulphite yeast.

11. In a process of recovering fatty and resinous acids from the so-called "soap" floating on the waste-liquors obtained in the manufacture of sulphate- or sodium cellulose, the step which comprises treating the said "soap" at a temperature above ordinary room temperature with sulphite waste-liquor obtained in the manufacture of sulphite alcohol.

12. A process as claimed in claim 1 wherein the liberated fatty and resinous acids are extracted with an organic solvent and the solvent is then evaporated.

13. In a process of recovering fatty and resinous acids from the so-called "soap" floating on the waste-liquors obtained in the manufacture of sulphate- or sodium cellulose, the steps which comprise treating the said "soap" with sulphite waste-liquor, allowing the mixture to stand until it separates into two layers, extracting the resinous and fatty acids from the upper layer with an organic solvent and evaporating the said solvent.

In testimony whereof I affix my signature.

CARL HENRIK MICHELSON.